United States Patent Office 3,734,964
Patented May 22, 1973

3,734,964
SELECTIVE PARTIAL REDUCTION OF NITROPARAFFIN SUBSTRATES
John F. Knifton, Wappingers Falls, N.Y., assignor to Texaco Inc., New York, N.Y.
No Drawing. Filed Mar. 17, 1969, Ser. No. 807,943
Int. Cl. C07c 13/00
U.S. Cl. 260—566 A                12 Claims

ABSTRACT OF THE DISCLOSURE

This invention concerns the selective partial reduction of nitroparaffin substrates to the corresponding oxime under mild conditions using critical ratios of copper salt catalysts, nitrogenous base and water.

This invention concerns the partial reduction of nitroparaffin substrates to the corresponding oxime in good yield and substantially free from amine contaminants.

More particularly, this invention concerns the use of copper salts to effect the substantially quantitative reduction of nitroparaffin substrates to the oxime under selected mild reaction conditions.

Oximes are valuable starting materials in the preparation of organic products and in themselves. For example, they react with hydrogen cyanide to form a hydroxyaminonitriles, undergo the Beckmann rearrangement and can be acylated to useful products.

Paraffinone oximes are commonly prepared by the interaction of ketones with hydroxylamine hydrochloride (or sulfate) in the presence of an inorganic base. Unfortunately the reaction is reversible, and although the desired products are produced some undesirable contaminants are simultaneously produced and must be removed. Further, the ketones starting materials are not always available or are relatively costly to prepare. It would be desirable to produce the paraffinone oximes from nitroparaffins since these are conveniently available in large supply.

Various procedures have been developed for the production of oximes from nitroparaffins but for various reasons they are not entirely satisfactory. For example, the direct reduction of nitroparaffins with acetic acid and zinc has been proposed but yields are poor because of the simultaneous production of the fully reduced amine. Various other indirect procedures are available but they usually require several steps, provide difficulties in isolation, or require special equipment. What is particularly needed is a direct reduction process which utilizes the relatively inexpensive and readily available nitroparaffins as starting materials, yet which would produce the oxime in good yields substantially free from the fully reduced amines. Desirably, the reductive process would function under mild conditions of temperature and pressure, and would be equally effective in utilizing nitroparaffins in either purified form or in the form of their crude nitration mixtures.

A further advantage would be the use of long lasting and relatively inexpensive hydrogenation catalyst in presently existing process equipment. A selective reduction process combining most of these attributes would reduction process combining most of these attributes would represent an advance in synthetic organic chemistry.

Quite unexpectedly the applicant has found that a catalyst system comprising copper salts, nitrogenous complexing base and water, known to fully reduce aromatic nitrocompounds to their amines, can be modified to selectively and partially reduce certain nitroparaffins quantitatively to the oxime product with little or no production of the paraffinic amine. This was particularly unexpected inasmuch as the published conditions for the use of the catalyst not only do not suggest the partial reduction of aryl nitro compounds to their oximes, but under the disclosed reaction conditions will not produce the desired paraffinone oximes. Applicant however, by carefully controlling the concentration and ratio of the copper salt, nitrogenous base and water components of the catalyst system to each other, has developed a process for producing the desired oxime in substantial yield free from amine contaminant generally within relatively short process times.

It is an object of this invention to provide a direct method for producing paraffinone oximes from nitroparaffins in good yield and substantially free from the fully reduced paraffinic amines produced in the reductive processes of the prior art.

Another object of this invention is the development of the aforesaid selective reductive process capable of utilizing nitrated paraffins, mixtures of nitrated paraffins and their crude nitration mixtures as starting materials.

Another more specific object of this invention is to provide processes for reducing nitroparaffins containing from 3 or more carbon atoms, in good yield, under mild conditions, to their corresponding oximes utilizing presently available techniques and process equipment.

An even more specific object of this invention is the conversion of a known non-selective reduction process for aryl nitro compounds to a selective process for the reduction of nitroparaffins by controlling the concentration of the components of the catalyst system.

Additional objects are the development of reduction processes employing an inexpensive, stable and long-lived catalyst system which gives optimum results under relatively mild reaction conditions utilizing presently available process equipment and techniques presently utilized in the art.

Further objects will suggest themselves to those skilled in the art of catalysis after a perusal of this invention.

In practice, the above objects are achieved by heating the nitroparaffin to be reduced, with a catalyst system comprising copper salt and nitrogenous base, said copper salt and base being present in a critical ratio, in an aqueous environment in a carbon monoxide atmosphere, util substantially all of the nitroparaffins are reduced to the corresponding paraffinone oximes.

In the preferred practice the process comprises the steps of:

(1) admixing each molar equivalent of the nitroparaffin substrate to be reduced with a catalyst system comprising:
  from 0.1 to 2 molar equivalents of copper salt,
  from 0.5 to 100 molar equivalents of nitrogenous base capable of solubilizing the copper salts, and miscible with water, and
  from 0.5 to 100 molar equivalents of water,
(2) providing a carbon monoxide atmosphere,
(3) heating the admixture between about 80 and 115° C. at pressures ranging from about atmospheric to superatmospheric until substantial conversion of the nitrated paraffins to their paraffinone oximes are obtained, and
(4) isolating the oxime produced therein.

In order to aid in the understanding of the inventive concept, the following additional disclosure is submitted:

(A) Nitroparaffin substrate—any non-aromatic substrate containing at least 3 carbon atoms and at least one or more nitro groups per molecule can be employed. The most useful substrates are the mono-nitro linear and cyclic paraffins such as the nitrohexanes, nitrocyclohexanes, nitroheptanes, nitrooctanes, nitrononanes, nitrodecanes, nitroundecanes, nitrododecanes and their higher homologues. The preferred nitroparaffins are nitrocyclohexane and the nitroparaffins containing 10 to 20 carbon atoms, in the form of purified compound singly or in mixtures, or in the form of their crude nitration mixtures. This narrower group of nitroparaffin substrates are preferred because they lend themselves to substantialy complete conversion to the paraffinone oximes under relatively complete conversion to the paraffinone oximes under relatively mild reduction conditions within relatively short reaction times. In addition, these nitroparaffin substrates are readily available in large quantities at low cost.

(B) Inert diluent.—The novel reduction process proceeds most rapidly in the absence of inert diluent. However, it is frequently desirable to utilize the crude or partially purified nitration mixtures derived from the vapor-liquid phase nitration of n-paraffin streams as starting materials without stripping off the unreacted n-paraffins. Further, the presence of a water-immiscible diluent or solvent facilitates isolation of the oxime product by concentrating the product within the organic phase. For these reasons, inert diluents or solvents can be employed without adversely effecting the degree of conversion to the oxime. Broadly speaking, any liquid in which the nitroparaffin substrate is soluble, and which is inert to reduction under the conditions of the invention process, can be used as diluents. These include the alkyl ethers such as diethyl ether, dibutyl ether, aromatics such as benzene, toluene and xylene, as well as the aforementioned liquid paraffins. Where the nitroparaffins are reduced in the absence of diluents, one or more of these diluents can be used to extract the oxime product from the reaction mixture and facilitate purification. Particularly useful for this purpose are the dialkyl ethers.

(C) Carbon monoxide atmosphere.—Insofar as can be determined the best balance of high conversion to the oxime within a short reaction time without substantial formation of amine is obtained using a substantially carbon monoxide gaseous atmosphere. Nitrogen or hydrogen used alone are unsatisfactory, while reductions conducted in mixtures of carbon monoxide with hydrogen or nitrogen are either undesirably slow or give rise to formation of substantial quantities of amine.

Ordinarily the carbon monoxide is sparged into the reactor after all the liquid components of the reaction mixture have been added, until the air is flushed out of the system. Then the heating in the carbon monoxide atmosphere is continued until the desired reduction takes place.

(D) Temperature.—The reaction temperature used in the reaction is critical in at least two respects. Below 40° C. the rate of reduction is too slow to be measured while above 105–110° C. the volatility of the water and base requires a pressurized system to minimize loss of volatiles. The process is operable from about 60° C. up to about 150° C. or higher. Inasmuch as the best balance of yield versus reaction time is obtained between 80–115° C., at atmospheric pressure, this represents the preferred heating range.

(E) Pressure.—Reactor pressures from about atmospheric to superatmospheric can be employed. Pressures between about 250 to 1000 p.s.i.g. for reasons presently unclear, retard the conversion rate and are therefore to be avoided. Higher pressures require special pressurized reactors and increase operating hazards without any concomitant gain. For these reasons pressures from atmospheric to 250 p.s.i.g. are preferred.

(F) Reaction times.—The reaction times required for substantial production of the oximes is a variable dependent primarily upon batch size, the concentration of copper catalyst, the dilution of nitrogenous complexing base in the charge, and the number of reducible nitro groups per molecule. Where the concentration of the nitrogenous base is at least 60% by wt., and the molar ratio of copper salt to mononitroalkane is at least 1:4, the reduction is complete within 12, usually within 6 hours. Di- and higher nitrated paraffins may require longer reaction times.

(G) Catalyst system.—The catalyst system comprises the copper salt component, the nitrogenous base component used to complex the copper salt and the water in the system. The catalyst parameters, based upon the reduction of a mononitro-paraffin substrate, appear below. Di- and higher nitrated substrates may require somewhat larger quantities of the various components of the catalyst system.

(1) Copper salt.—As indicated earlier, copper salts which are soluble in aqueous solutions of nitrogenous bases can be employed as the copper salt component. These include the copper salts of the acids such as the mono-di and polycarboxylic acids such as cupric acetate, cupric formate, cupric tartrate, cupric citrate, as well as the copper salts of strong acids including cupric chloride, cuprous chloride and cupric sulfate. While both classes of cupric salts give fairly comparable yields, the reaction times are generally shorter when the copper salts of weak acids are used and these represent the preferred copper salts.

The concentration of copper salts in the aqueous nitrogenous base ordinarily range from about 0.5% by weight up to about 20% by weight and higher. The preferred range is from 5 to 15% by weight of the copper salt component.

(2) Nitrogenous base.—The nitrogenous bases are selected from those aliphatic amines which are miscible with water and which are capable of solubilizing various copper salts. Generally the aliphatic amines having $pK_a$ base strengths in aqueous solution of at least 9.5 (measured at 25–30° C.), such as ethylenediamine, 1,2-propanediamine, 1,3-propanediamine, 3,3'-diaminodipropylamine, 1,6-hexanediamine, triethylenetetramine and the like, function well, are readily available and hence are preferred. Ammonia, pyridine, tetramethylethylenediamine, morpholine and diethanolamine are unsatisfactory. The role of the base in the reduction process is not clear. However, unless at least about 60% by weight of the nitrogenous base is present in the reaction mixture no substantial reduction takes place. Preferably at least 75% by weight based upon the weight of base should be present to obtain optimum yields of oxime in the shortest possible reaction times.

(3) Water concentration.—The concentration of the water in the reaction mixture is necessary insofar as it is believed to be the source of hydroxyl ion used in the reduction. However, if too much water is present it acts as a diluent for the nitrogenous base and the reduction to oxime either doesn't take place at all or the rate is substantially retarded. For this reason the presence of water is critical to success, and unless the water-nitrogenous balance is such that the required 60% by weight or higher concentration of nitrogenous base is available during the reduction it is extremely slow.

(H) Experimental procedure.—The reductive process is ordinarily performed as follows:

A reaction vessel fitted with gas inlet, condenser, mechanical stirrer and capable of being pressurized, is charged with: for each molar equivalent of nitroalkane, from 0.05 to 100 molar equivalents of copper salt, from 0.1 to 500 molar equivalents of nitrogenous base and from 0.1 to 500 molar equivalents of water, in which the water represents no more than 25 by wt. of the base solution. Carbon monoxide is passed in to saturate the catalyst solution and provide a carbon monoxide atmosphere. The resulting reaction mixture which is a deep blue from the base-copper complex, is heated between about 80 and 115° C. for up to 12 hrs. at pressures ranging from near atmospheric up to about 250 p.s.i.g. until the desired oxime product is produced. If inert diluent is present the oxime is concentrated in the organic phase, if no inert diluent was employed the reaction mixture is extracted with dialkyl ether or aromatic solvent to separate the oxime. In either event the crude product in organic solvent is washed several times with water, then vacuum distilled to produce the oxime product. Elemental analysis, infra-red and nuclear magnetic resonance spectra are used to establish that the desired oxime product has been prepared.

Having described the inventive process in general terms, the following examples are submitted to supply specific and illustrative embodiments:

Example 1.—Preparation of n-dodecane oxime from a nitrododecane-n-dodecane mixture To a suitable reactor provided with pressurizing, heating, cooling, stirring and distillation means are added 1 part by weight of a nitrated charge stock containing 25.9% by weight of nitrododecane (0.25 moles) and 64.1% by weight of n-dodecane, and 2 parts by weight of an aqueous, 87% by weight ethylenediamine solution containing 5% (w./v.) copper acetate (0.25 mole). The molar ratio of copper salt to nitrododecane is 1:1. Carbon monoxide is passed into the reactor to produce a gaseous atmosphere and the reaction mixture is heated to 90° C. in the carbon monoxide atmosphere to reduce the nitrated substrate. After 4 hours the reduction is complete and the reaction mixture is allowed to cool down to room temperature. Two phases appear upon cooling, a lower aqueous blue phase and an upper, slightly yellow, organic phase. The organic phase containing the oxime product is separated and washed with an excess of water. The organic phase is vacuum distilled to give the oxime product in quantitative yield. Gas chromatography, infra-red and nuclear magnetic resonance techniques are employed to confirm the identity of the oxime and the absence of amine or other reduction contaminants.

| Example | Reaction time, hrs. | Molar ratio copper salt to nitroparaffin | Temperature, °C. | Conversion |
|---|---|---|---|---|
| 2 | 4 | 1:2 | 82 | 100 |
| 3 | 6 | 1:4 | 83–88 | 100 |
| 4 | 20 | 1:10 | 80–95 | 100 |

Again, infra-red, nuclear magnetic resonance, gas chromatography and comparison of the oxime product with standards produced by other preparative processes, establish the desired oxime is produced.

Examples 5–15.—Effect of variations of catalyst concentration and solvent composition on the product of oxime Using the same nitrated n-dodecane substrate, catalyst and techniques described in Example 1, the following reductions are run varying the copper salt, ethylenediamine and water concentration. Table I shows the results obtained.

TABLE I

| Example | Copper acetate conc., percent w./v. | Copper acetate:nitrododecane, molar ratio | Ethylenediamine conc., percent v./v. | Temp., °C. | Pressure of CO, atm. | Time, hrs. | Percent conversion of nitrododecane to oxime |
|---|---|---|---|---|---|---|---|
| 5 | 1 | 1:10 | 90 | 85 | 1 | 6 | 35 |
| 6 | 2.5 | 1:4 | 90 | 85 | 1 | 6 | 52 |
| 7 | 5 | 1:2 | 90 | 85 | 1 | 5½ | 100 |
| 8 | 10 | 1:1 | 90 | 85 | 1 | 5½ | 95 |
| 9 | 20 | 2:1 | 90 | 85 | 1 | 6 | 66 |
| 10 | 10 | 1:1 | 100 | 85 | 1 | 2½ | 100 |
| 11 | 10 | 1:1 | 95 | 85 | 1 | 2½ | 100 |
| 12 | 10 | 1:1 | 80 | 85 | 1 | 6 | 48 |
| 13 | 10 | 1:1 | 70 | 85 | 1 | 6 | 38 |
| 14 | 10 | 1:1 | 60 | 85 | 1 | 6 | 15 |
| 15 | 10 | 1:1 | 50 | 85 | 1 | | (1) |

[1] No reaction.

As can be seen from Table I, concentrations of ethylenediamine between 60 and 70% give slower conversions while 50% concentrations of ethyelnediamine give no measurable reduction at all.

Examples 16–29.—Preparation of the oxime of Example 1 using different nitrogenous base complexing units The preparation of Example 1 is repeated except that the following amines, shown on Table II, are substituted for ethylenediamine on a volume-by-volume basis. All the aliphatic amines evaluated are miscible with water and are capable of solubilizing copper salts. It can be seen from Table II that, of those amines evaluated, only those having $pK_a$ values of 9.5 and above are found to be suitable solvents for the reduction of nitroparaffins to oximes. Aliphatic amines having base strengths significantly less than 9.5 produced no oxime product.

TABLE II

| Example | Solvent | $pK_a$[1] | Cooper acetate:substrate, molar ratio | Amine:water, volume ratio | Temp., °C. | Time, hrs. | Oxime produced |
|---|---|---|---|---|---|---|---|
| 16 | Pyridine | 5.17 | 1:2 | 9:1 | 85 | 5 | No. |
| 17 | N,N,N',N'-tetramethylethylenediamine | 5.85 | 1:2 | 9:1 | 85 | 6 | No. |
| 18 | Morpholine | 8.36 | 1:2 | 9:1 | 80 | 6 | No. |
| 19 | Ammonia | 9.21 | 1:1 | 3:7 | 60–80 | 5 | No. |
| 20 | Diethanolamine | 9.35 | 1:1 | 9:1 | 85 | 6 | No. |
| 21 | 1,2-diaminopropane | 9.78 | 1:1 | 9:1 | 85 | 8 | Yes. |
| 22 | Triethylenetetramine | 9.92 | 1:2 | 9:1 | 85 | 6 | Yes. |
| 23 | Ethylenediamine | 9.98 | 1:2 | 9:1 | 90 | 2.5 | Yes. |
| 24 | n-Hexylamine | 10.40 | 1:1 | 9:1 | 85 | 3.5 | Yes. |
| 25 | 1,3-diaminopropane | 10.54 | 1:1 | 9:1 | 85 | 8 | Yes. |
| 26 | n-Butylamine | 10.59 | 1:1 | 9:1 | 75 | 2.5 | Yes. |
| 27 | 3,3'-iminobispropylamine | 10.70 | 1:2 | 9:1 | 85 | 6 | Yes. |
| 28 | 1,6-diaminohexane | 11.11 | 1:1 | 9:1 | 85 | 8 | Yes. |
| 29 | Piperidine | 11.22 | 1:1 | 9:1 | 70 | 6 | Yes. |

[1] First acid dissociation constant at 25° C. in aqueous solution.

Examples 2–4.—Reduction of the same nitrododecane-n-dodecane mixture under varying reaction conditions Using the same nitrododecane-n-dodecane mixture, reduction conditions and work-up procedure described in Example 1, the following reductions to the oxime product are obtained varying the ratio of copper salt to nitroparaffin substrate, and the reaction temperature.

Examples 30–40.—Effect of varying temperatures and gaseous atmosphere

In this example, the reduction of Example 1 is repeated, varying the gaseous atmosphere and reaction temperature. Table III shows the results obtained. It should be noted that good yields are obtained in the range of 70 to 140° C. The most rapid conversions are obtained between 80 and 115° C. The use of hydrogen atmosphere, mixtures of hydrogen and carbon monoxide or nitrogen appear to offer no advantages over carbon monoxide itself.

tion white crystals of the oxime product are prepared. Elemental analysis, infra-red analysis, nuclear magnetic resonance and gas chromatography establish that the desired product is formed.

TABLE III

| Example | Copper acetate conc., percent w./v. | Copper acetate: nitrododecane, molar ratio | Ethylenediamine conc., percent v./v. | Temp., °C. | Pressure | Time, hrs. | Percent conversion of nitrododecane |
|---------|---|---|---|---|---|---|---|
| 30 | 10 | 1:1 | 90 | 140 | 1 atmosphere of CO | 6 | 100 |
| 31 | 10 | 1:1 | 90 | 115 | do | 2 | 100 |
| 32 | 10 | 1:1 | 90 | 105 | do | 1¼ | 100 |
| 33 | 10 | 1:1 | 90 | 95 | do | 1¾ | 100 |
| 34 | 10 | 1:1 | 90 | 85 | do | 5 | 94 |
| 35 | 10 | 1:1 | 90 | 70 | do | 6 | 51 |
| 36 | 10 | 1:1 | 90 | 40 | do | 6 | (¹) |
| 37 | 10 | 1:1 | 95 | 105 | do | ¾ | 100 |
| 38 | 10 | 1:1 | 90 | 85 | 1 atmosphere (33/CO, 67/H₂) | 6 | 51 |
| 39 | 10 | 1:1 | 90 | 85 | 1 atmosphere (H₂) | 6 | 37 |
| 40 | 10 | 1:1 | 90 | 85 | 1 atmosphere (N₂) | 6 | 18 |

¹ No reaction.

Examples 41–46.—Effect of superatmospheric pressures on the reduction of nitrated substrates to the oxime Using the procedure of Example 1, reductions of a charge stock comprising 12–15% by weight $C_{10} \rightarrow C_{14}$ nitroparaffins and 88–85% by weight $C_{10} \rightarrow C_{14}$ n-paraffin, are run using 90% vol./vol. concentration of ethylenediamine in water and the copper catalyst of Example 1 in a 1:4 molar ratio to the nitroparaffin substrate. Reductions are carried out at 85–90° C. under carbon monoxide pressures of 0–1000 p.s.i.g. After 4 hours the mixtures are quenched and gas chromatography analysis is used to determine conversion to the desired oxime product. As can be seen by Table IV, pressures in excess of 250 p.s.i.g. retard conversion rate.

The product upon acidic hydrolysis conditions is converted quantitatively into caprolactam, an intermediate for the commercial preparation of nylon 6.

Example 49.—Reduction of $C_{10} \rightarrow C_{14}$ nitro n-paraffins to $C_{10} \rightarrow C_{14}$ n-paraffinone oximes A one part-by-weight portion of a reaction mixture comprising 15 parts by weight of $C_{10} \rightarrow C_{14}$ nitroparaffins and 3 parts by weight oxygenates and 82 parts by weight of $C_{10} \rightarrow C_{14}$ paraffins produced by the vapor-liquid phase nitration of $C_{10} \rightarrow C_{14}$ n-paraffins with $NO_2$, is charged into a reactor equipped with heating, cooling, distillation and stirring means along with 0.15 parts by weight of copper acetate, 0.1 part by weight of water and 1.2 parts by weight of ethylenediamine and the resultant re-

TABLE IV

| Example | Type of reactor | Catalyst conc., percent w./v. | Ethylenediamine solvent, by vol. | Temp., °C. | Pressure | Reaction time, hrs. | Nitroparaffin conversion, percent |
|---|---|---|---|---|---|---|---|
| 41 | Glassware | 10 | Aqueous 90% | 85 | 1 atmosphere (CO) | 4 | 49.5 |
| 42 | Stirred autoclave | 10 | do | 90 | 250 p.s.i.g. (CO) | 4 | 51.6 |
| 43 | do | 10 | do | 90 | 500 p.s.i.g. (CO) | 4 | 33.8 |
| 44 | Rocking autoclave | 10 | do | 85 | 200 p.s.i.g. (CO) | 4 | 46.9 |
| 45 | do | 10 | do | 85 | 500 p.s.i.g. (CO) | 4 | 28.1 |
| 46 | do | 10 | do | 85 | 1,000 p.s.i.g. (CO) | 4 | 37.0 |

Example 47.—Varying the composition of copper salt component

In these runs the nitrated n-dodecane substrate of Example 1 is reduced using the same quantities of nitrogenous base, water and copper salts as well as identical reaction conditions. The sole exception is the substitution on a weight-by-weight basis of cuprous chloride, cupric sulfate and cupric chloride for cupric acetate in the three runs. In all instances 50% conversions are obtained within 2 hours and 90% conversions to the oxime within 10 hours.

Example 48.—Reduction of nitrocyclohexane to cyclohexanone oxime

Using the general reduction procedure and isolation and purification techniques described in Example 1, a 1 part-by-weight portion of nitrocyclohexane is mixed in a suitable reactor with 1 part by weight of copper acetate, 1 part by weight of water and 9 parts by weight of ethylenediamine. Carbon monoxide is sparged into the reaction mixture at atmospheric pressure and the reaction mixture is heated with agitation to 100° C. for 3 hours to give a 90% conversion to the cyclohexanone oxime. After cooling the oxime is twice extracted from the reactor mixture with 5 parts by-weight portions of benzene to give a deep red extract. After vacuum distillaaction mixture is purged with carbon monoxide until a carbon monoxide atmosphrere is produced. The reaction mixture is heated with stirring for 2 hours at 105° C. then cooled to produce a lighter organic phase and a blue aqueous phase. The organic phase is separated, washed with excess water and distilled under vacuum to produce a 90% yield of the paraffinone oximes as confirmed by infra-red, nuclear magnetic resonance, elemental analysis and gas chromatography.

Example 50.—Reduction of $C_{16} \rightarrow C_{20}$ nitroparaffins to $C_{16} \rightarrow C_{20}$ paraffinone oximes Using the general procedure described in Example 49, a 0.3 parts-by-weight portion of nitrated $C_{16} \rightarrow C_{20}$ n-paraffins containing 25% by weight of $C_{16} \rightarrow C_{20}$ nitroparaffins in 75% by weight of $C_{16} \rightarrow C_{20}$ n-paraffins is charged to a reactor containing the same quantities of copper acetate catalyst, ethylenediamine and water as was used in Example 49. The reduction is conducted at atmospheric pressure by heating at 90° C., with stirring, for 48 hours—a conversion of 70% is obtained. Upon vacuum distillation (0.4–1.5 mm. pressure), a purified oxime product is obtained which elemental analysis, gas chromatography, infra-red and nuclear magnetic resonance data confirm to be the desired product.

Example 51.—Reduction of $C_{14} \rightarrow C_{15}$ n-nitroparaffins to $C_{14} \rightarrow C_{15}$ n-paraffinic oximes Using the same technique described in Example 1, a 10 parts-by-weight portion of nitrated $C_{14} \rightarrow C_{15}$ n-paraffins containing 25% by weight of $C_{14} \rightarrow C_{15}$ nitroparaffins is charged to a reactor as described in Example 49. The crude, acidic nitration mixture is derived from the vapor-liquid phase nitration of $C_{14} \rightarrow C_{15}$ n-paraffin with $NO_2$. The catalyst charge comprises 0.6 parts by weight of copper acetate, 10 parts by weight of ethylenediamine and 1 part by weight of water. A carbon monoxide atmosphere is maintained during reduction. The heating is for 2 hours at 100° C. at atmospheric pressure. A yield of 97% $C_{14} \rightarrow C_{15}$ paraffinone oxime is obtained as confirmed by infra-red, gas chromatography and nuclear magnetic resonance data.

Example 52.—Reduction of nitrodecane to its oxime

Using the same general procedure described in Example 1, a charge comprising 5 parts by weight of copper acetate, 90 parts by weight of ethylenediamine, and 10 parts by weight of water is stirred rapidly and saturated with carbon monoxide. The resulting deep blue solution is stirred rapidly and a 10.5 parts-by-weight portion of nitrodecane is added to form a reaction mixture. The reaction mixture is heated to 85° C. for 5 hours, cooled and extracted with diethyl either. The etheral extract is distilled under 5 mm. vacuum leaving a reddish-colored residue which infra-red and nuclear magnetic resonance data confirm to be the expected oxime product.

Example 53.—Reduction of other nitroparaffins

Using the same quantities of copper acetate catalyst, ethylenediamine and water and the procedure of Example 1, 10 parts-by-weight portions of nitropropane and nitrobutane are selectively reduced to the corresponding oximes after saturating the stirred reaction mixture with carbon monoxide. In each instance temperatures of 85° C. are employed and the reduction is run for 8 hours. Again, infra-red and nuclear magnetic resonance confirm the identity of the oxime product.

As the preceding disclosure and the numerous examples indicate, the reductive process of this invention is both advantageous and unexpected. For example, not only are yields of the oxime good but the reduction proceeds rapidly and the oxime product is substantially free from the fully reduced paraffinic amines in contrast to processes of the art. In addition, reaction conditions are mild, the catalyst is stable and relatively inexpensive and standard process equipment may be employed.

The inventive reduction process of this invention gives unexpected results in view of the previously mentioned reference J.A.C.S., vol. 32, pp. 2021–2022 (1967). This article describes the use of a copper salt-amine catalyst complex to fully reduce aryl nitro compounds to their corresponding amines in a carbon monoxide atmosphere. However, as can be seen by Example 15, attempts to repeat the procedures used in Table I of the cited article, using nitroparaffin substrates of applicant's invention were unsuccessful. It is considered most surprising that the cited process was not applicable to applicant's substrates until a critical ratio of nitrogenous base to water was employed.

While the ratio of nitrogenous base to water is critical to the inventive process, the inventive process in other respects is relatively flexible. That is, substrates, solvents, reaction temperatures and reaction pressures can be varied, modified and the like without changing the inventive concept. The metes and bounds of this invention are best determined by the claims which follow, read in conjunction with the preceding specification.

What is claimed is:
1. A process for reducing a nitroparaffin containing at least 3 carbon atoms to the corresponding paraffinone oxime consisting essentially of the steps of:
   (a) admixing each molar equivalent of the nitroparaffin with a catalyst system consisting essentially of:
      (1) at least 0.05 molar equivalents of a water soluble copper salt of an acid selected from the group consisting of mineral acids and alkanoic acids,
      (2) at least 0.1 molar equivalents of an alkyl amine miscible with water and which has a $pK_a$ of at least 9.5, when measured at 25–30° C., said amine being present in an amount of at least 60% by weight based on the reaction mixture,
      (3) at least 0.1 molar equivalents of water to form a reaction mixture: then
   (b) passing carbon monoxide gas into the reaction mixture to form a carbon monoxide saturated reaction mixture and to provide a carbon monoxide atmosphere, and
   (c) heating the reaction admixture in the presence of said carbon monoxide atmosphere, at a temperature ranging from about 60° C. to about 150° C. to convert the nitroparaffin to the corresponding oxime, at a pressure ranging from atmospheric up to about 250 p.s.i.g., and
   (d) isolating the oxime product.

2. The process of claim 1 wherein the copper salt is a salt of a mineral acid.

3. The process of claim 1 wherein the nitroparaffin substrates consist essentially of a mixture of nitroparaffins.

4. The process of claim 3 wherein the nitroparaffin substrates consist essentially of a mixture of nitroparaffins and inert diluent.

5. The process of claim 4 wherein the copper salt is the salt of alkanoic acid, the alkyl amine has 1 to 4 amino groups, and the weight ratio of said alkyl amine to water is at least 75:25.

6. A process for partially reducing mixtures of nitroparaffin substrates containing 10 to 20 carbon atoms, to the corresponding paraffinone oxime products without producing substantial quantities of the fully reduced paraffinic amines, consisting essentially of the steps:
   (a) admixing each molar equivalent of nitroparaffin containing 10 to 20 carbon atoms with a catalyst system consisting essentially of:
      (1) from 0.1 to 2 molar equivalents of a water soluble copper salt of an alkanoic acid, dissolved in a solvent mixture consisting essentially of:
      (2) from 0.5 to 100 molar equivalents of an alkyl amine miscible with water which has a $pK_a$ of at least 9.5, when measured at 25–30° C., said amine being present in an amount of at least 60% by weight based upon the reaction mixture, and from 0.5 to 100 molar equivalents of water;
   (b) passing carbon monoxide gas into the catalyst solution to produce a carbon monoxide saturated catalyst solution and to provide a carbon monoxide atmosphere,
   (c) heating the admixture of said nitroparaffins, catalyst system saturated with carbon monoxide between about 80° and 115° C. at a pressure ranging from about atmospheric up to about 250 p.s.i.g., until substantially all of the nitroparaffins are partially reduced to the corresponding paraffinone oxime products, and
   (d) isolating the paraffinone oximes produced therein.

7. The process of claim 1 wherein the weight of alkyl amine base to reaction mixture is at least 75% by weight and the reaction mixture contains n-paraffins as inert diluent.

8. The process of claim 6 wherein the nitroparaffin substrate comprises a mixture of $C_{10}$–$C_{14}$ nitroparaffins.

9. The process of claim 8 wherein the nitroparaffin substrate comprises a substantial quantity of paraffinic solvent.

10. The process of claim 9 wherein the paraffinic solvent comprises a mixture of $C_{10} \rightarrow C_{20}$ paraffins.

11. The process of claim 1 wherein the nitroparaffin to be reduced to the oxime is nitrocyclohexane.

12. The process of claim 6 wherein the nitroparaffin is nitrodecane.

References Cited

UNITED STATES PATENTS

| | | | |
|---|---|---|---|
| 2,762,844 | 9/1956 | Kaarsemaker | 260—566 A |
| 2,768,206 | 10/1956 | Kaarsemaker | 260—566 A |
| 3,354,212 | 11/1967 | Donaruma | 260—566 A |
| 2,945,065 | 7/1960 | Donaruma | 260—566 A |

LEON ZITVER, Primary Examiner

N. MORGENSTERN, Assistant Examiner

U.S. Cl. X.R.

252—428, 429